Aug. 14, 1945.
M. A. CROSBY
2,381,866
APPARATUS FOR INDUCTION HEATING OF MOLDING MACHINES
Filed July 24, 1939
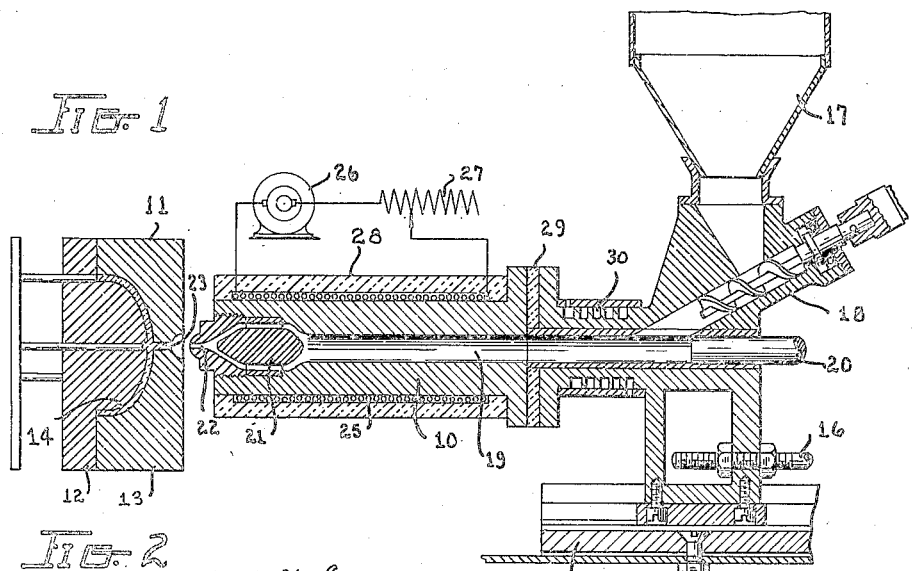
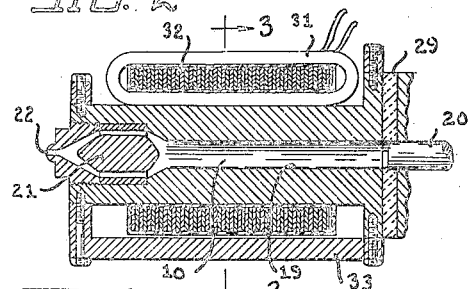
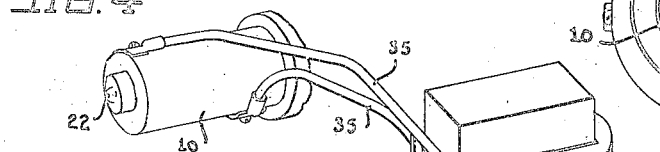
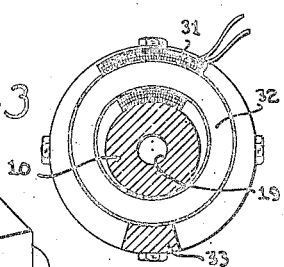
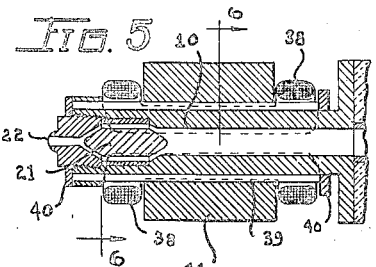
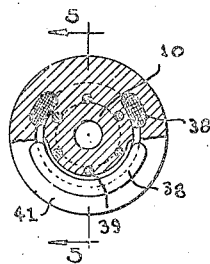
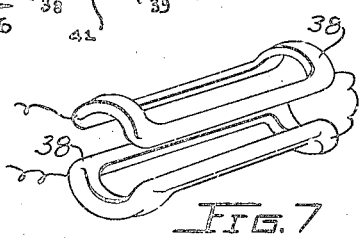
Inventor
MELVIN A. CROSBY
by Koulmin & Koulmin
Attorneys Patented Aug. 14, 1945

2,381,866

UNITED STATES PATENT OFFICE 2,381,866

APPARATUS FOR INDUCTION HEATING OF MOLDING MACHINES

Melvin A. Crosby, Dayton, Ohio, assignor to The Hydraulic Development Corp., Inc., Wilmington, Del., a corporation of Delaware Application July 24, 1939, Serial No. 286,065

4 Claims. (Cl. 18—30)

This invention relates to plastic injection molding and more particularly to an improved apparatus for heating thermoplastic and thermosetting materials, so that they can be injection molded.

One object of this invention is to utilize induced heat produced by high or low frequency electric current.

Another object is to provide an improved apparatus for economically and efficiently heating the plastic material being injection molded without the use of expensive and complicated fluid heating means, for instance, with the use of steam, hot liquids, such as water, oil, etc., under pressure.

Another object is to provide an improved injection molding mechanism wherein the injection cylinder is heated by electric induction currents produced in the surface of the cylinder by electric current means, which is arranged to flow therearound.

Another object is to provide means for inducing the flow of a large current of electricity through the walls of the injection chamber containing the material being molded in such a manner that the injection chamber is rapidly heated to the molding temperature of the plastic material.

Another object is to devise means for heating the injection cylinder by the use of high or low alternating electric current whereby induced current in the injection chamber walls is sufficient to raise the temperature of the chamber to that required for softening the material to be molded.

These, and other objects and advantages will occur to those skilled in the art in the light of the following description and drawing.

In the drawing,

Figure 1 is an elevation view in section of my improved injection molding machine, using high frequency induced electric current heating means;

Figure 2 is a sectional view of an injection cylinder, partly broken away illustrating a modification wherein low frequency electric current induction heating means is used for raising the temperature of the injection cylinder so as to plasticize the molding material therein;

Figure 3 is a sectional view taken on the line 3—3 of Figure 2;

Figure 4 is a diagrammatic perspective view illustrating the heating of the injection cylinder by means of electrical current induced in a secondary transformer circuit which includes the injection cylinder wherein the transformer is remotely located from the injection cylinder;

Figure 5 is a sectional view of modification wherein a squirrel-cage induction heating arrangement is provided;

Figure 6 is a partial section view taken substantially along the line 6—6 of Figure 5.

Figure 7 is a diagrammatic view in perspective illustrating the shape and arrangement of the coil utilized.

General procedure

In injection molding the plastic material is heated outside the mold until a soft, flowable dough-like mass is formed and then while in this heated stage it is forced into the mold cavity under heavy pressure. Heretofore injection molding was confined to thermoplastic materials as contrasted with thermosetting substances which were molded by the compression method on account of the inability to properly control the temperature and speed of the molding so as to complete the molding prior to setting or cooling of the material. Thermoplastics remain soft and flowable under heat and pressure, whereas thermosetting materials after being heated, for a certain length of time, taken on a permanent irreversible set.

By my improved process the plastic material is heated in a cylinder adjacent to the mold and the material is rapidly brought up to a temperature at which it is flowable and is thereafter immediately injected under pressure into the mold. The temperature of the cylinder is readily controlled by varying the current of the primary circuit or the windings of the transformer so that the induced current is such as required to heat the cylinder to the proper temperature. The heating and injection of the plastic material into the mold is preferably performed automatically and at such a speed that the setting or curing of thermosetting substances does not occur until after it has been injected into the mold cavity. In both compression and injection molding the most important problem is the uniform heating of the material and control of its temperature so as to maintain the material at the required molding temperature, without overheating it, so that it can be satisfactorily molded. Too high a temperature must be avoided, particularly in the case of thermosetting materials, to prevent discoloration and decomposition of the plastic material.

When injection molding thermosetting plastics, the molds are maintained hot, but for thermoplastics the mold is preferably cooled by any suitable means, such as by circulating cold water therearound.

Injection molding mechanism

Referring to the drawing in detail, there is illustrated in Figure 1 the conventional type of injection molding mechanism wherein the transfer injection cylinder 10 and mold 11 is suitably mounted so as to be capable of being brought together. The mold 11 comprises the dies 12 and 13 which are assembled together and provide the mold cavity 14. The injection cylinder 10 is slidably mounted on the base 15, so that it can be periodically moved in contact with the mold 11, and the plastic material in the bore 19 injected in the mold cavity. For reciprocating the injection cylinder a push-pull member 16 is provided which is connected to a suitable prime mover.

Material to be molded such as cellulose, acetate, ethyl cellulose, acrylic, urea and phenol formaldehyde, resins and the like plastics, is placed in the hopper 17 from where it is fed by a suitable conveyor means 18 into the bore 19 of the injection cylinder 10. Preferably the material to be molded is in the form of powder, granules, flakes, chips or the like.

Mounted for reciprocation in the cylinder bore 19 is a plunger or piston 20 which is operated as a ram by hydraulic or other equivalent means to force the softened plastic material outward over the spreader 21, nozzle 22, gate 23, into the mold cavities 14. The machine is preferably automatically operated so that the proper amount of material is introduced into the injection cylinder where it is heated to a plastic state and thereafter the injection cylinder and mold are brought together and ram 20 actuated to inject the plastic into the mold cavity 14.

After the injection of the plastic material into the mold is completed, the mold and injection cylinder are moved apart and returned to the positions shown in Figure 1. Plunger 20 is then moved to the right preparatory to repeating the cycle of operation, after the mold has been opened and the molded article ejected therefrom.

Method of heating material to be molded

For heating the material in the bore of the cylinder 10, as illustrated in Figure 1, there is arranged circumferentially therearound a coil 25 having electrical connections thereto for supplying alternating electric current of high frequency from a generator, such as illustrated at 26. A rheostat 27 is arranged in the circuit to provide suitable means for varying the amount of current passing through the coil 25. Superimposed over the coil and outer surface of the injection cylinder is a layer of heat insulating material 28. Similarly, heat insulating material is positioned at 29 to prevent conduction of heat from the cylinder back into the feeding mechanism and the associated parts. A cooling chamber 30 may be provided around the forward portion of the feeding mechanism in order to prevent preheating of the molding material prior to its introduction into the injection cylinder bore 19.

The current supplied to coil 25 preferably is of a frequency of 1000 to 3000 and such as to induce heating of the cylinder to a temperature of about 300° to 700° F., or as may be required to soften the material which is to be molded. Ordinarily the wattage of the current should approximate 10,000 to 13,000 in order to provide sufficient heat to rapidly bring the injection cylinder to the temperature required for plasticizing the material to be molded.

As illustrated in Figures 2, 3 and 4, an alternative arrangement of the injection cylinder is shown wherein low frequency induction heating is provided. In this instance, a primary coil 31 is arranged around a core 32, which surrounds the injection cylinder 10. Connected to the ends of the injection cylinder 10 is a low resistance strip or bar member 33, which forms a secondary circuit in which current is induced to flow when electric current flows through the primary coil 31. The current in the primary circuit may be of a low frequency and voltage, for instance, of 110 or 220 volt, 60 cycle, so that a large current is induced to flow through the circuit formed by the injection cylinder and the low resistance bar 33. The resistance offered by the injection cylinder which may be made of carburized nickel steel, is sufficient to heat the cylinder to a temperature of around 300° to 700° F., depending upon the amount of current induced to flow through the cylinder walls.

The temperature in the injection cylinder is readily controlled to within fractional degrees by varying the amount of current flowing through the primary circuit. In this way the proper temperature in the cylinder bore can be accurately maintained. It will be understood that suitable recording temperature means such as thermometers, pyrometers, etc., will be employed for determining the temperature of the cylinder bore and plastic material so that the material being molded can be maintained at the required temperature for molding.

Heating of the injection cylinder may be effected without surrounding the injection cylinder with the transformer coils, as for instance, the transformer 34 may be remotely located from the cylinder, as illustrated in Figure 4, and suitable electric conducting leads 35 extended from the ends of the secondary circuit member 36 to the injection cylinder 10 and strap 33.

In Figures 5 and 6 there is illustrated another arrangement for utilizing induction electrical heating. In this instance, the primary coil windings 38, secondary circuit low resistance bars 39, and inter-connecting rings 40 are positioned around the injection cylinder 10 similar as in the case of a squirrel-cage or wound-rotor alternating current induction motor. The secondary circuit here comprising the cylinder portion 41 and bars 39 correspond to the rotor of an induction type motor, which is held stationary and becomes heated due to the large amount of current induced to flow through the parts.

It will be appreciated that either single or poly-phase relative high or low frequency alternating electric current may comprise the primary circuits. By the use of this principle of induction heating in connection with injection molding, as disclosed herein, the temperature within the injection cylinder can be controlled to within a narrow range, so that the danger of overheating or underheating the material being molded is avoided.

It will be understood that my invention is not limited to the specific embodiments of my invention as herein illustrated, and that various modifications may be made by those skilled in the art without departing from the spirit of this invention.

Having thus fully described our invention,

What we claim as new and desire to secure by Letters Patent, is:

1. An injection type molding apparatus comprising a mold and an injection cylinder containing plastic material to be molded, a high frequency primary coil surrounding at least a portion of the cylinder and a secondary circuit for said coil, said circuit including conductors embedded in the cylinder and disposed in inductive relation with respect to said primary coil.

2. An injection type molding apparatus comprising a mold and an injection cylinder containing plastic material to be molded, a high frequency primary coil surrounding at least a portion of the cylinder and a secondary circuit for said coil, said circuit including low resistance members embedded in said cylinder and disposed in inductive relation with respect to said primary coil, said coil constituting an element which extends along the length of the cylinder and has a magnetic field directed transversely of the cylinder.

3. An injection type molding apparatus comprising a mold and an injection cylinder containing plastic material to be molded, a high frequency primary coil surrounding at least a portion of the cylinder and a secondary circuit for said coil, said circuit including low resistance members embedded in said cylinder and disposed in inductive relation with respect to said primary coil, said primary coil constituting a pair of oppositely disposed coils formed to the shape of the cylinder and extending lengthwise thereof.

4. An injection type molding apparatus comprising a mold and an injection cylinder containing plastic material to be molded, a high frequency primary coil surrounding at least a portion of the cylinder and a secondary circuit for said coil, said circuit including low resistance members embedded in said cylinder and disposed in inductive relation with respect to said primary coil, said primary coil constituting a hollow cylinder of elongated shape conforming to the configuration of the cylinder, and a core within the primary coil and extending transversely of the cylinder.

MELVIN A. CROSBY.